United States Patent
Li

(10) Patent No.: US 11,258,623 B2
(45) Date of Patent: Feb. 22, 2022

(54) STATEFUL IGMP FASTLEAVE

(71) Applicant: ARRIS Enterprises LLC, Suwanee, GA (US)

(72) Inventor: Feng Li, Shenzhen (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/736,025

(22) Filed: Jan. 7, 2020

(65) Prior Publication Data

US 2020/0220740 A1 Jul. 9, 2020

Related U.S. Application Data

(60) Provisional application No. 62/789,507, filed on Jan. 7, 2019.

(51) Int. Cl.
*H04L 12/18* (2006.01)
*H04L 12/761* (2013.01)
*H04L 12/801* (2013.01)
*H04L 29/06* (2006.01)
*H04W 4/06* (2009.01)
*H04W 72/00* (2009.01)
(Continued)

(52) U.S. Cl.
CPC .......... *H04L 12/185* (2013.01); *H04L 12/189* (2013.01); *H04L 45/16* (2013.01); *H04L 47/15* (2013.01); *H04L 65/103* (2013.01); *H04L 65/4076* (2013.01); *H04W 4/06* (2013.01); *H04W 72/005* (2013.01); *H04W 88/16* (2013.01)

(58) Field of Classification Search
CPC ..... H04L 12/185; H04L 12/189; H04L 45/16; H04L 47/15; H04L 65/103; H04L 65/4076; H04W 4/06; H04W 72/005; H04W 88/16
See application file for complete search history.

(56) References Cited

U.S. PATENT DOCUMENTS 8,880,737 B1 * 11/2014 Bell .................... H04L 65/4084
709/250
9,660,819 B2 * 5/2017 Gouache ............... H04L 65/403
(Continued)

OTHER PUBLICATIONS

H. Asaeda, H. Liu, Q. Wu, Tuning the Behavior of the Internet Group Management Protocol (IGMP) and Multicast Listener Discovery (MLD) for Reuters in Mobile and Wireless Networks. RFC 6636 IETF, May 2012 (Year: 2012).*

(Continued)

*Primary Examiner* — Habte Mered
(74) *Attorney, Agent, or Firm* — Wenderoth, Lind & Ponack, L.L.P.

(57) ABSTRACT

Methods, systems, and computer readable media described herein can be operable to facilitate an IGMP fastleave using a listener reference count. A gateway proxy saves each listener for every specific multicast group, thus the gateway knows if a listener is the last one in the group when it receives a leave report from a listener. The gateway leaves the group immediately without sending specific query if the leave report comes from the last listener of the current group, thereby significantly reducing the leave latency. Otherwise, the standard procedure wins, and the gateway sends out a specific query when the leave report is not from the last listener.

20 Claims, 7 Drawing Sheets

(51) Int. Cl.
  *H04W 88/16*    (2009.01)
  *H04L 45/16*    (2022.01)
  *H04L 47/10*    (2022.01)
  *H04L 65/1023*  (2022.01)
  *H04L 65/611*   (2022.01)

(56) References Cited

U.S. PATENT DOCUMENTS

| | | | |
|---|---|---|---|
| 2010/0316050 A1* | 12/2010 | Baykal | H04L 12/185 |
| | | | 370/390 |
| 2013/0128886 A1* | 5/2013 | Shah | H04L 12/18 |
| | | | 370/390 |
| 2013/0128887 A1* | 5/2013 | Shah | H04L 12/185 |
| | | | 370/390 |
| 2013/0286921 A1* | 10/2013 | Agarwal | H04L 29/0653 |
| | | | 370/312 |
| 2014/0026174 A1* | 1/2014 | Baykal | H04N 21/4384 |
| | | | 725/111 |
| 2018/0077431 A1* | 3/2018 | Wei | H04L 29/06 |

OTHER PUBLICATIONS

International Search Report dated Mar. 10, 2020 in International (PCT) Application No. PCT/US2020/012471.
H. Asaeda, "IGMP/MLD-Based Explicit Membership Tracking Function for Multicast Routers; draft-ietf-pim-explicit-tracking-12. txt", Internet Engineering Task Force, IETF; Standard Working Draft, Internet Society (ISOC) 4, Geneva, Switzerland, Oct. 19, 2015, pp. 1-10, XP015109279.
Q. Wu et al., "Proposal for Tuning IGMPv3/MLDv2 Protocol Behavior in Wireless and mobile networks; draft-wu-multimob-igmp-mld-tuning-01.txt", Internet Engineering Task Force, IETF; Standard Working Draft, Internet Society (ISOC) 4, Geneva, Switzerland, May 18, 2010, pp. 1-19, XP015068592.
International Preliminary Report on Patentability dated Jun. 16, 2021 in International (PCT) Application No. PCT/US2020/01247.

* cited by examiner

STATEFUL IGMP FASTLEAVE

CROSS REFERENCE TO RELATED APPLICATION

This application is a non-provisional application claiming the benefit of U.S. Provisional Application Ser. No. 62/789,507, entitled "Stateful IGMP Fastleave," which was filed on Jan. 7, 2019, and is incorporated herein by reference in its entirety.

TECHNICAL FIELD

This disclosure relates to a stateful IGMP fastleave.

BACKGROUND

With standard IGMP (Internet group management protocol) protocols/implementation, there are several problems when doing channel zapping. For example, joining new multicast groups is faster than leaving previous groups since leave has latency (IGMP uses query expiration to decide if there are other listeners for a specific group). This will accumulate unnecessary resources on a CPE (customer premise equipment) device such as a gateway (e.g., multimedia gateway) and on a headend device such as a CMTS (cable modem termination system). The issue is critical even when changing the LMQI (Last Membership Query Interval) to, for example, 1 second. As another example of a current problem with IGMP and channel zapping, if normal fastleave (an implementation in TS/RDKB, the gateway reports leave to CMTS immediately when it receives leave report from LAN (local area network) side) is enabled, another client device (e.g., DVR (digital video recorder) at a STB (set-top box)) listening to the same multicast group will lose the stream since the gateway leaves the group. The stream will be recovered automatically until a next general query interval.

Therefore, it is desirable to improve upon methods and systems for carrying out an IGMP fastleave.

BRIEF DESCRIPTION OF THE DRAWINGS

Like reference numbers and designations in the various drawings indicate like elements.

DETAILED DESCRIPTION

It is desirable to improve upon methods and systems for carrying out an IGMP fastleave. Methods, systems, and computer readable media described herein can be operable to facilitate an IGMP fastleave using a listener reference count. A gateway proxy saves each listener for every specific multicast group, thus the gateway knows if a listener is the last one in the group when it receives a leave report from a listener. The gateway leaves the group immediately without sending specific query if the leave report comes from the last listener of the current group, thereby significantly reducing the leave latency. Otherwise, the standard procedure wins, and the gateway sends out a specific query when the leave report is not from the last listener. This database (listeners and reference count for a specific group) can be synced/established even when the gateway proxy restarts since the proxy will send out a general query when it restarts. Responses to the general query can be used to setup this database.

Figure 1:
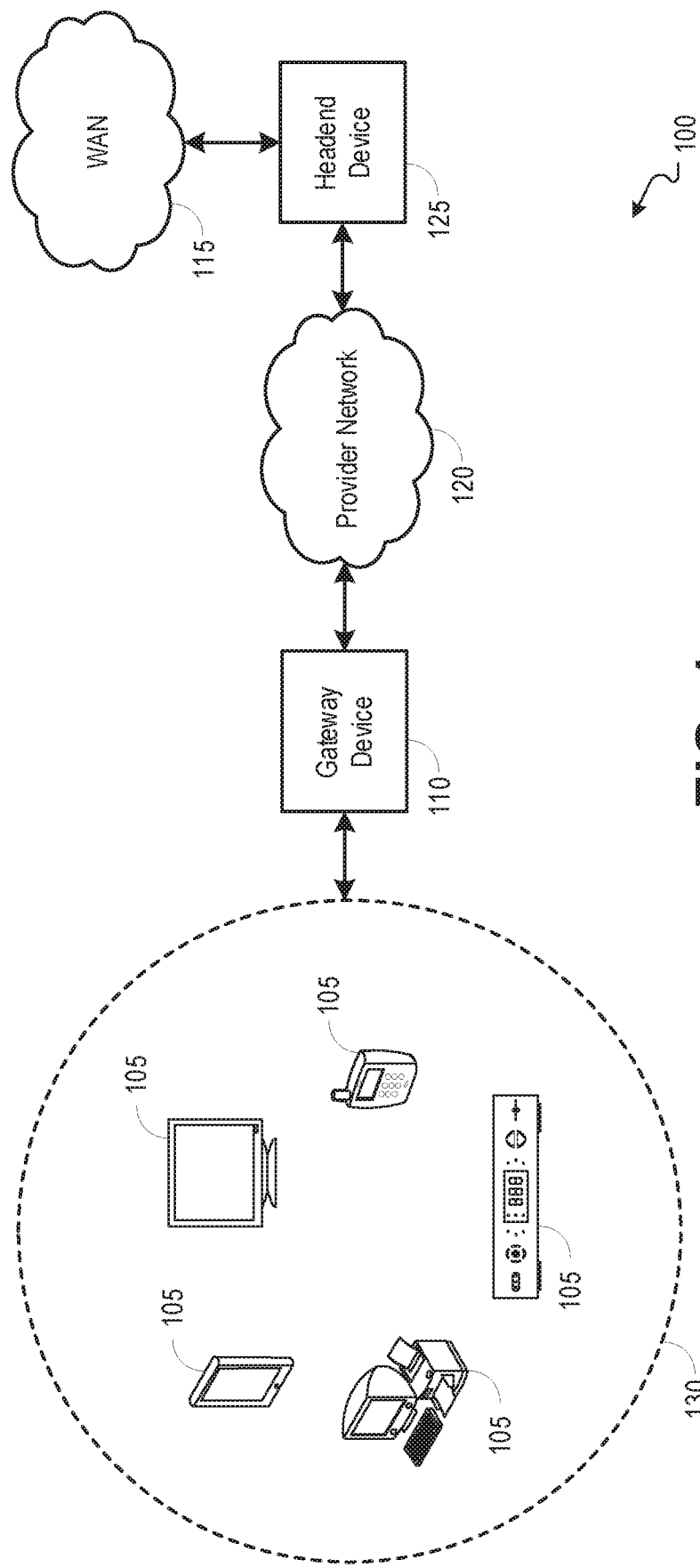
FIG. 1 is a block diagram illustrating an example network environment operable to facilitate an IGMP fastleave using a listener reference count.

FIG. 1 is a block diagram illustrating an example network environment 100 operable to facilitate an IGMP fastleave using a listener reference count. In embodiments, video, voice, and/or data services may be delivered to one or more client devices 105. Client devices 105 may include televisions, mobile devices, tablets, computers, set-top boxes (STB), telephones, gaming devices, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, and others.

In embodiments, one or more services delivered to a subscriber premises may be received and forwarded to one or more client devices 105 by a gateway device 110 (e.g., residential gateway, multimedia gateway, etc.). It should be understood that the devices shown in FIG. 1 may be integrated. For example, a client device 105 such as a television may be connected to a STB, and a user interface may be received from a STB and displayed to a user through a connected display device.

In embodiments, multiple services (e.g., video, voice, and/or data services) may be delivered from a wide-area network (WAN) 115 to a gateway device 110 through a connection between the gateway device 110 and a provider network 120. The provider network 120 may include an optical network, hybrid fiber coaxial (HFC) network, digital subscriber line (DSL) network, twisted-pair, mobile network, high-speed data network, MoCA network, and others. Multiple systems operator (MSO) or service provider devices and/or networks within the WAN 115 may be used to provide, manage, and/or troubleshoot the multiple services provided to subscribers. In embodiments, a client device 105 may receive one or more services from the gateway device 110. For example, Internet protocol television (IPTV) content or any other streaming content may be streamed from the gateway device 110 to a client device 105 for output to an associated display device (e.g., television).

The delivery of services from the WAN 115 to a gateway device 110 may be facilitated by a headend device 125 (e.g., CMTS).

In embodiments, multiple services may be delivered from the gateway device 110 to one or more client devices 105 through a local network 130. The local network may include a local area network (LAN), wireless local area network (WLAN), personal area network (PAN), Multimedia over Coax Alliance (MoCA) network, mobile hotspot network, and others. The local network may be provided at a subscriber premises by the gateway device 110 or one or more other access points within the premises. It will be appreciated by those skilled in the relevant art that delivery of the multiple services over the local network may be accomplished using a variety of standards and formats.

In embodiments, an IGMP proxy at the gateway device 110 may maintain a listener reference count for each specific multicast groups of one or more multicast groups. The listener reference count may reflect the number of listeners (i.e., client devices 105) that are currently joined to the associated multicast group. The listener reference count for each multicast group may be established by the IGMP proxy using responses to a general query that is sent by the IGMP proxy during a startup procedure. The IGMP proxy may send out a general query to the one or more client devices 105 whenever the IGMP proxy is restarted. Each of the received responses to the general query may identify a client device 105 and each of one or more specific multicast groups to which the client device 105 is joined.

When the gateway device 110 receives a join request from a client device 105, the IGMP proxy may increase the listener reference count for the specific multicast group identified by the join request and save the client device 105 as a listener of the specific multicast group if the client device 105 from which the join request is received is not currently in the specific multicast group.

When the gateway device 110 receives a leave request from a client device 105, the IGMP proxy may decrease the listener reference count for the specific multicast group identified by the leave request and remove the client device 105 as a listener of the specific multicast group if the client device 105 from which the leave request is received is currently in the specific multicast group. After decreasing the listener reference count in response to receiving the leave request, the IGMP proxy may check the value of the listener reference count. If the listener reference count has reached a value of zero, the gateway device 110 may report a leave for the specific multicast group (i.e., the multicast group identified from the leave request that is received from the client device 105) to the headend device 125 immediately. If the listener reference count has not reached a value of zero, the gateway device 110 may send out a specific query to the client devices 105 over the local network 130 to determine whether there are other listeners of the specific multicast group and related timers may be started.

Using the listener reference counts, the IGMP proxy provides for reduced leave latency without impacting other listeners for a specific multicast group when one listener of the specific multicast group leaves the current group. The IGMP proxy determines exactly when a fastleave is necessary and when it is necessary to leave when a query expires. For example, consider both a first and second client device 105 are listening to a first channel. When the second client device 105 switches to a second channel, the gateway device 110 cannot leave the first channel if the first client device 105 is still listening to the first channel.

Figure 2:
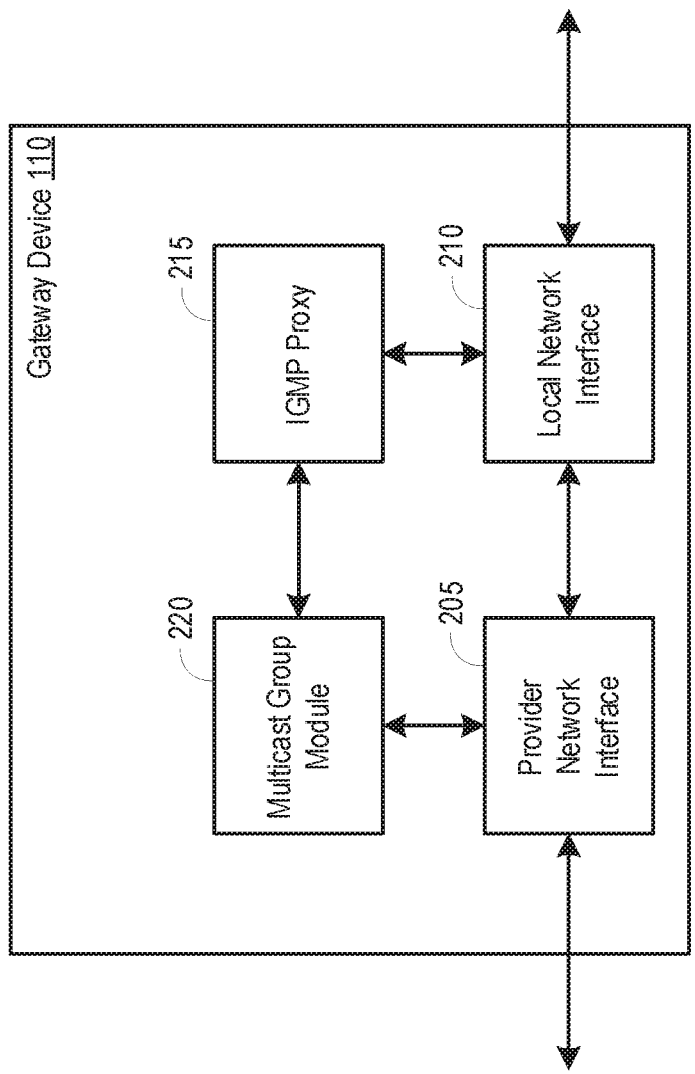
FIG. 2 is a block diagram illustrating an example gateway device operable to facilitate an IGMP fastleave using a listener reference count.

FIG. 2 is a block diagram illustrating an example gateway device 110 operable to facilitate an IGMP fastleave using a listener reference count. The gateway device 110 may include a provider network interface 205, a local network interface 210, an IGMP proxy 215, and a multicast group module 220. The gateway device 110 may receive media, data, and other services, and may otherwise communicate with a headend device 125 of FIG. 1 through the provider network interface 205. The gateway device 110 may communicate over a local network (e.g., local network 130 of FIG. 1) with one or more client devices 105 of FIG. 1 via the local network interface 210.

In embodiments, the IGMP proxy 215 may maintain a listener reference count for each specific multicast group of one or more multicast groups. The listener reference count for each multicast group may be established by the IGMP proxy 215 using responses to a general query that is sent by the IGMP proxy 215 during a startup procedure. The IGMP proxy 215 may send out a general query to the one or more client devices 105 whenever the IGMP proxy 215 is restarted. Each of the received responses to the general query may identify a client device 105 and each of one or more specific multicast groups to which the client device 105 is joined.

When the IGMP proxy 215 receives a join request from a client device 105, the IGMP proxy 215 may increase the listener reference count for the specific multicast group identified by the join request and save the client device 105 as a listener of the specific multicast group if the client device 105 from which the join request is received is not currently in the specific multicast group.

When the IGMP proxy 215 receives a leave request from a client device 105, the IGMP proxy 215 may decrease the listener reference count for the specific multicast group identified by the leave request and remove the client device 105 as a listener of the specific multicast group if the client device 105 from which the leave request is received is currently in the specific multicast group. After decreasing the listener reference count in response to receiving the leave request, the IGMP proxy 215 may check the value of the listener reference count. If the listener reference count has reached a value of zero, the multicast group module 220 may report a leave for the specific multicast group (i.e., the multicast group identified from the leave request that is received from the client device 105) to the headend device 125 immediately. If the listener reference count has not reached a value of zero, the gateway device 110 may send out a specific query to the client devices 105 over the local network 130 to determine whether there are other listeners of the specific multicast group and related timers may be started.

The IGMP proxy may maintain a database that includes various parameters and information associated with each of one or more client devices 105 and/or each of one or more multicast groups. For example, the parameters and information may include, for each client device 105: a multicast group last joined; a timestamp for the last join request received from the client device; and others. As another example, the database may include a list of client devices that are currently joined to each of one or more multicast groups.

Figure 3:
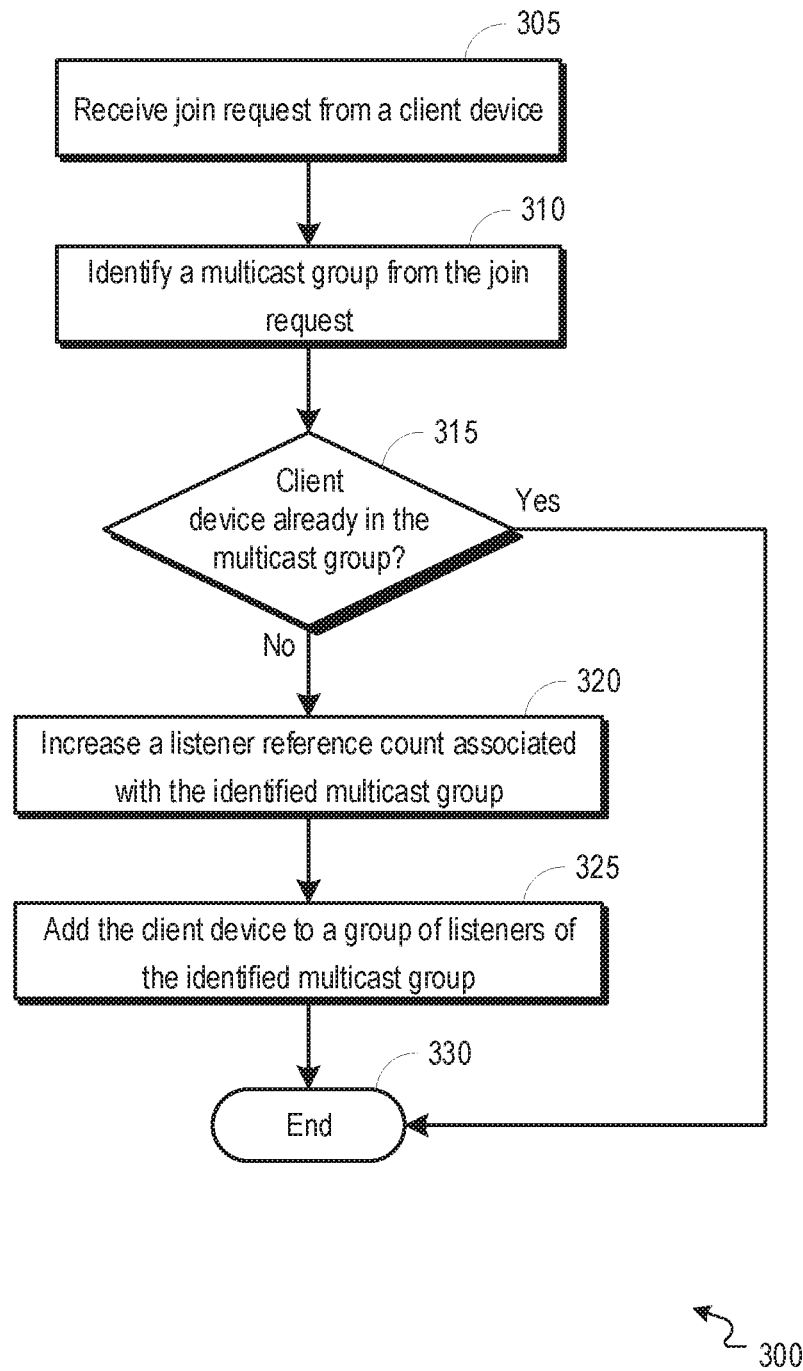
FIG. 3 is a flowchart illustrating an example process operable to facilitate a modification of a listener reference count in response to receiving a join request.

FIG. 3 is a flowchart illustrating an example process 300 operable to facilitate a modification of a listener reference count in response to receiving a join request. The process 300 may be carried out by a gateway device 110 of FIG. 1. The process 300 can begin at 305, when a join request (e.g., IGMP join request) is received from a client device (e.g., client device 105 of FIG. 1). The join request may be received by the gateway device 110 and may be recognized by an IGMP proxy (e.g., IGMP proxy 215 of FIG. 2). The join request may include an identification of the client device 105 from which it is received and an identification of a specific multicast group that the client device 105 is requesting to join. The IGMP proxy 215 may identify the specific multicast group from the received join request at 310.

At 315, a determination may be made whether the client device from which the join request is received is already in the multicast group. For example, the IGMP proxy 215 may check a database to determine whether the client device is already saved as a listener of the identified multicast group.

If, at 315, the determination is made that the client device is not already in the multicast group, the process 300 may proceed to 320. At 320, a listener reference count associated with the identified multicast group may be increased, for example, by a value of one (1). For example, the IGMP proxy 215 may increment a value of the listener reference count associated with the identified multicast group.

At 325, the client device may be added to a group of listeners of the identified multicast group. For example, the IGMP proxy 215 may save the client device as a listener that is joined to the specific multicast group.

Returning to 315, if the determination is made that the client device is already in the multicast group, the process 300 may end at 330.

Figure 4:
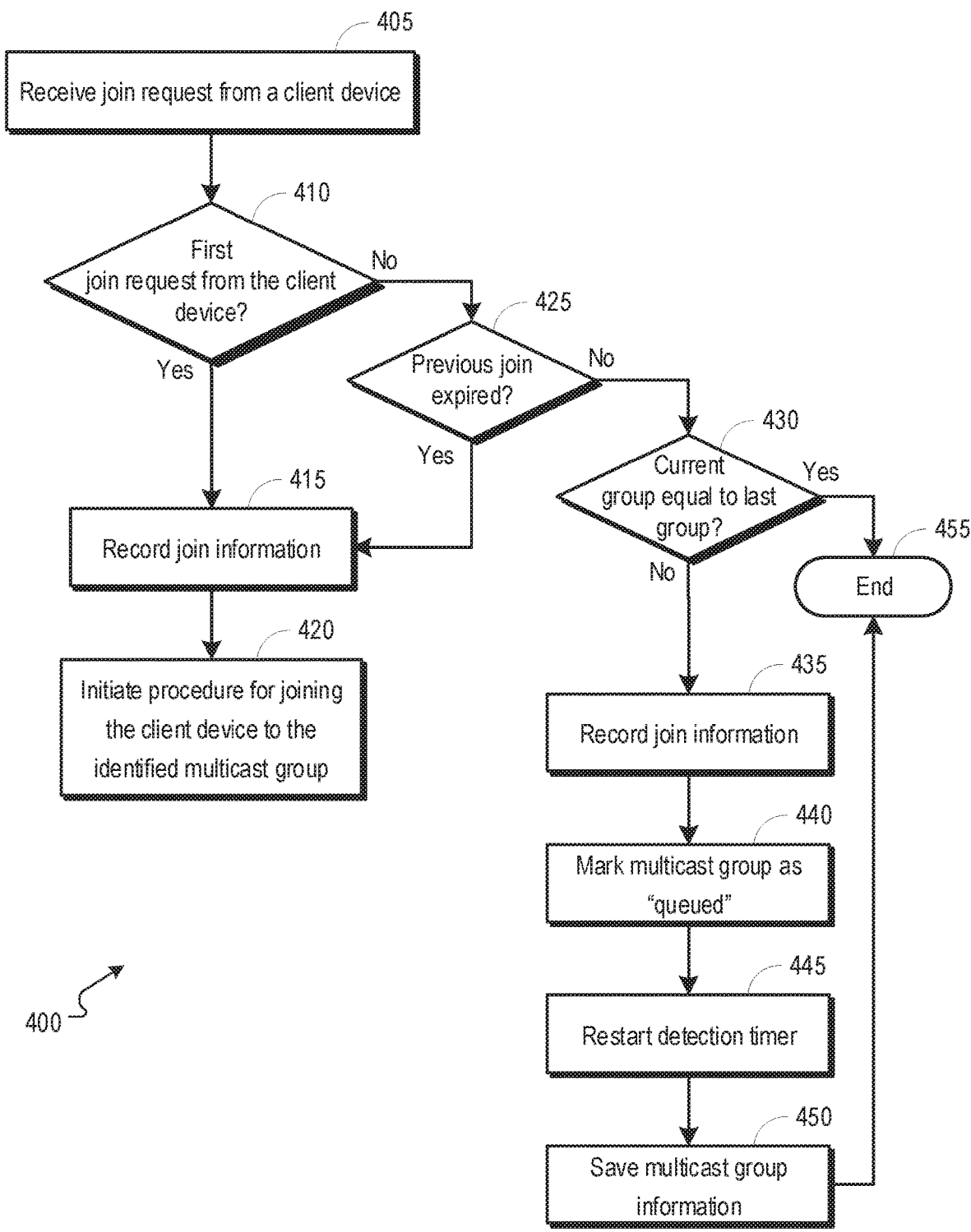
FIG. 4 is a flowchart illustrating an example process operable to respond to a received join request.

FIG. 4 is a flowchart illustrating an example process 400 operable to respond to a received join request. The process 400 may be carried out by a gateway device 110 of FIG. 1. The process 400 can begin at 405, when a join request (e.g., IGMP join request) is received from a client device (e.g., client device 105 of FIG. 1). The join request may be received by the gateway device 110 and may be recognized by an IGMP proxy (e.g., IGMP proxy 215 of FIG. 2).

At 410, a determination may be made whether the received join request is the first join request received from the client device. For example, the IGMP proxy 215 may check a database to determine whether the client device is associated with a previously received join request.

If, at 410, the determination is made that the received join request is the first join request received from the client device, the process 400 may proceed to 415. At 415, join information for the client device may be recorded. For example, the IGMP proxy 215 may update a last-join timestamp parameter for the client device by saving the join timestamp associated with the join request as the last join request received from the client device, and the IGMP proxy 215 may update a last-group parameter for the client device by saving the multicast group associated with the join request as the last multicast group joined by the client device.

At 420, the gateway device 110 may initiate a procedure for joining the client device to the multicast group associated with the received join request.

Returning to 410, if the determination is made that the received join request is not the first join request received from the client device, the process 400 may proceed to 425. At 425, a determination may be made whether a previous join request from the client device has expired. For example, the IGMP proxy 215 may determine whether a previous join request from the client device has expired by comparing a last-join timestamp associated with the client device to a current/now timestamp. If the last-join timestamp is prior to the current/now timestamp, the IGMP proxy 215 may determine that the previous join request has expired. If the determination is made that the previous join request has expired, the IGMP proxy 215 may record join information for the client device at 415.

If, at 425, the determination is made that the previous join request has not expired, the process 400 may proceed to 430. At 430, a determination may be made whether the current multicast group (i.e., the multicast group identified from the received join request) is the same group as a last multicast group joined by the client device. For example, the IGMP proxy 215 may compare the multicast group identified from the received join request to the last multicast group with which the client device is associated in a database.

If, at 430, the determination is made that the current multicast group is not the same group as the last multicast group joined by the client device, the process 400 may proceed to 435. At 435, join information for the client device may be recorded. For example, the IGMP proxy 215 may update a last-join timestamp parameter for the client device by saving the join timestamp associated with the join request as the last join request received from the client device, and the IGMP proxy 215 may update a last-group parameter for the client device by saving the multicast group associated with the join request as the last multicast group joined by the client device.

At 440, the multicast group may be marked as "queued." For example, the IGMP proxy 215 may update the multicast group associated with the received join request as including an updated/current list of client devices listening or joined to the multicast group.

At 445, a detection timer may be restarted. For example, the IGMP proxy 215 may cause an FCC detection timer to be restarted.

At 450, multicast group information may be saved. For example, the IGMP proxy 215 may cause current information associated with the specific multicast group to be saved and/or stored within a database.

Returning to 430, if the determination is made that the current multicast group is the same group as the last multicast group joined by the client device, the IGMP proxy 215 may determine that the received join request is a retransmitted join request, and the process 400 may end at 455.

Figure 5:
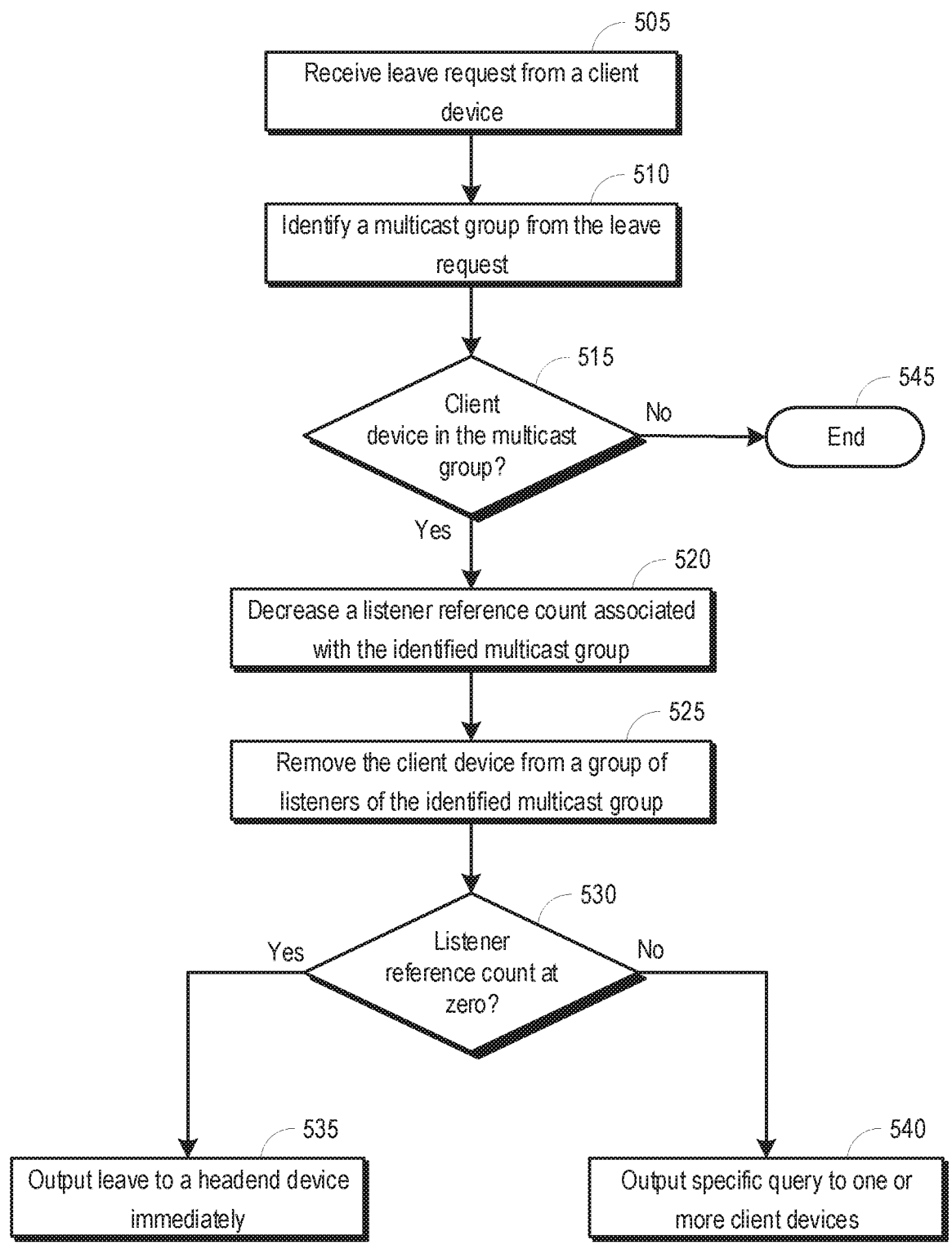
FIG. 5 is a flowchart illustrating an example process operable to facilitate a modification of a listener reference count in response to receiving a leave request.

FIG. 5 is a flowchart illustrating an example process 500 operable to facilitate a modification of a listener reference count in response to receiving a leave request. The process 500 may be carried out by a gateway device 110 of FIG. 1. The process 500 can begin at 505, when a leave request is received from a client device (e.g., client device 105 of FIG. 1). The leave request may be received by the gateway device 110 and may be recognized by an IGMP proxy (e.g., IGMP proxy 215 of FIG. 2). The leave request may include an identification of the client device 105 from which it is received and/or an identification of a specific multicast group that the client device 105 is requesting to leave. The IGMP proxy 215 may identify the specific multicast group from the received leave request at 510.

At 515, a determination may be made whether the client device from which the leave request is received is in the specific multicast group. For example, the IGMP proxy 215 may check a database to determine whether the client device is saved as a listener of the specific multicast group.

If, at 515, the determination is made that the client device is in the multicast group, the process 500 may proceed to 520. At 520, a value of a listener reference count associated with the identified multicast group may be decreased, for example, by a value of one (1). For example, the IGMP proxy 215 may decrease a value of the listener reference count associated with the identified multicast group.

At 525, the client device may be removed from a group of listeners of the identified multicast group. For example, the IGMP proxy 215 may delete the status of the client device as a listener that is joined to the specific multicast group.

At 530, a determination may be made whether the listener reference count associated with the identified multicast group has reached a value of zero (0). For example, the IGMP proxy 215 may check the value of the listener reference count after the listener reference count has been decreased at 520.

If, at 530, the determination is made that the listener reference count has reached a value of zero (0), the IGMP proxy 215 may determine that there are currently no other listeners of the identified multicast group (i.e., that there are no other client devices currently joined to the multicast group), and the process 500 may proceed to 535. At 535, the gateway device 110 may immediately report the leave for the identified multicast group to a headend device (e.g., headend device 125 of FIG. 1). For example, the gateway device 110 may report the leave for the identified multicast group prior to outputting a query to one or more other client devices, wherein the query is generated to determine whether any of the other client devices are joined to the specific multicast group.

If, at 530, the determination is made that the value of the listener reference count has not reached zero (0), the IGMP proxy 215 may determine that there may be one or more other client devices still joined to the specific multicast group, and the process 500 may proceed to 540. At 540, the gateway device 110 may send out a specific query to one or more client devices over a local network (e.g., local network 130 of FIG. 1) to determine whether there are other listeners of the specific multicast group, and related timers may be started. For example, the one or more other client devices may respond to the specific query, and the response may identify whether each of the one or more other client devices is currently joined to the specific multicast group.

Returning to 515, if the determination is made that the client device is not in the multicast group, the process 500 may end at 545.

Figure 6:
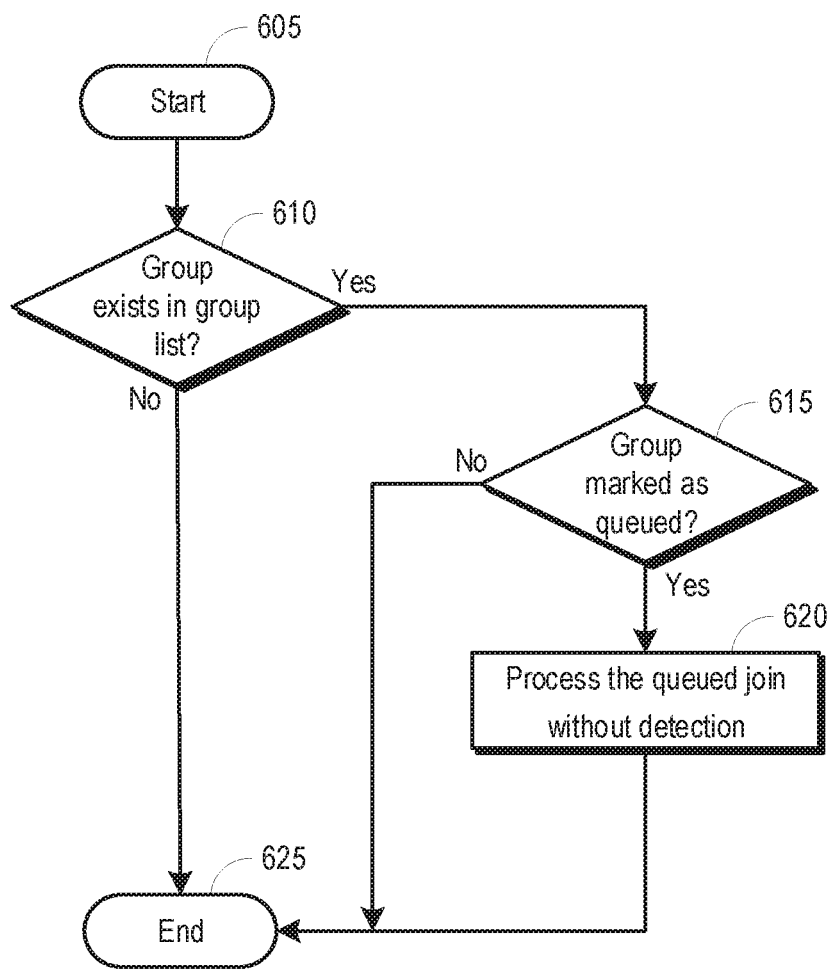
FIG. 6 is a flowchart illustrating an example process operable to respond to an expiration of a detection timer.

FIG. 6 is a flowchart illustrating an example process 600 operable to respond to an expiration of a detection timer. The process 600 may be carried out by a gateway device 110 of FIG. 1. The process 600 can begin at 605, when a detection timer (e.g., an FCC detection timer) expires with saved information of a specific multicast group.

At 610, a determination may be made whether the specific multicast group exists in a multicast group list. For example, an IGMP proxy 215 of FIG. 2 may check a database to determine whether the specific multicast group exists in a multicast group list.

If, at 610, the determination is made that the specific multicast group does exist in a multicast group list, the process 600 may proceed to 615. At 615, a determination may be made whether the multicast group is marked as "queued," or some similar marking.

If, at 615, the determination is made that the multicast group is marked as "queued," the determination may be made that the join has been delayed, and the queued join may be processed at 620. The queued join may be processed without detection (e.g., FCC detection).

If, at 615, the determination is made that the multicast group is not marked as "queued," the determination may be made that the group is not the multicast group that was queued, and the process 600 may end at 625.

Returning to 610, if the determination is made that the specific multicast group does not exist in a multicast group list, the determination may be made that the client device has left the specific multicast group, and the process 600 may end at 625.

Figure 7:
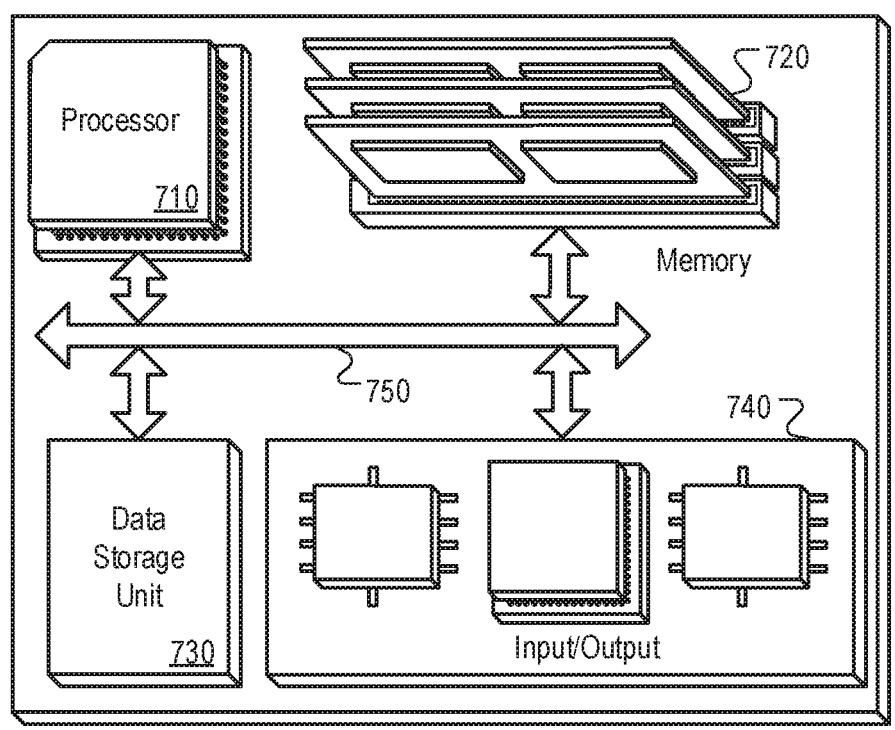
FIG. 7 is a block diagram of a hardware configuration operable to facilitate an IGMP fastleave using a listener reference count.

FIG. 7 is a block diagram of a hardware configuration 700 operable to facilitate an IGMP fastleave using a listener reference count. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, STB, computer, mobile device, tablet, etc.) or display device associated with a client device 105. In another implementation, the input/output device can include driver devices configured to send communications to, and receive communications from one or more networks (e.g., WAN 115 of FIG. 1, provider network 120 of FIG. 1, local network 130 of FIG. 1, etc.).

Those skilled in the art will appreciate that the invention improves upon methods and systems for carrying out an IGMP fastleave. Methods, systems, and computer readable media described herein can be operable to facilitate an IGMP fastleave using a listener reference count. A gateway proxy saves each listener for every specific multicast group, thus the gateway knows if a listener is the last one in the group when it receives a leave report from a listener. The gateway leaves the group immediately without sending specific query if the leave report comes from the last listener of the current group, thereby significantly reducing the leave latency. Otherwise, the standard procedure wins, and the gateway sends out a specific query when the leave report is not from the last listener. This database (listeners and reference count for a specific group) can be synced/established even when the gateway proxy restarts since the proxy will send out a general query when it restarts. Responses to the general query can be used to setup this database.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   establishing by an Internet group management protocol (IGMP) proxy at a gateway device a listener reference count using one or more responses to a general query sent by the IGMP proxy during a startup procedure from one or more client devices, wherein the listener reference count reflects a value of the one or more client devices that are currently joined to the multicast group;
   receiving the one or more responses to the general query, wherein the one or more response identify the one or more client devices and one or more multicast groups to which the one or more client device are joined;
   receiving a leave request from a client device of the one or more client devices, wherein the leave request is received at the gateway device;
   identifying from the leave request, a multicast group of the one or more multicast groups associated with the leave request;
   decreasing the value of the listener reference count that is associated with the identified multicast group;
   determining whether the value of the listener reference count has reached zero;
   if the value of the listener reference count has reached zero, reporting the leave request to a headend device without sending a specific query to the one or more client devices on a local network associated with the gateway device; and
   if the value of the listener reference count has not reached zero, outputting one or more specific queries to the one or more client devices on the local network associated with the gateway device.

2. The method of claim 1, wherein the value of the listener reference count is maintained by an IGMP (Internet group management protocol) proxy at the gateway device.

3. The method of claim 2, wherein the value of the listener reference count is maintained by increasing the value of the listener reference count by a value of one (1) each time a join request associated with the multicast group is received by the gateway device.

4. The method of claim 3, wherein the value of the listener reference count is increased after determining that the client device is not already saved as a listener of the identified multicast group.

5. The method of claim 1, wherein the value of the listener reference count is set before the leave request is received, based upon one or more responses to a general query output from the gateway device, the one or more responses being received by one or more of the client devices on the local network.

6. The method of claim 1, further comprising:
removing the client device from a group of listeners of the identified multicast group.

7. The method of claim 1, wherein the value of the listener reference count is decreased after determining that the client device is saved as a listener of the identified multicast group.

8. A gateway device comprising:
a computer-readable medium storing one or more instructions;
a processor that executes one or more instructions that cause the gateway device to:
establish by an Internet group management protocol (IGMP) proxy a listener reference count using one or more responses to a general query sent by the IGMP proxy during a startup procedure from one or more client devices, wherein the listener reference count reflects a value of the one or more client devices that are currently joined to the multicast group;
receive the one or more responses to the general query, wherein the one or more response identify the one or more client devices and one or more multicast groups to which the one or more client device are joined;
receive a leave request from a client device of the one or more client devices;
identify from the leave request, a multicast group of the one or more multicast groups associated with the leave request;
decrease the value of the listener reference count that is associated with the identified multicast group;
determine whether the value of the listener reference count has reached zero;
if the value of the listener reference count has reached zero, reports the leave request to a headend device without sending a specific query to the one or more client devices on a local network associated with the gateway device; and
if the value of the listener reference count has not reached zero, outputs one or more specific queries to the one or more client devices on the local network associated with the gateway device.

9. The gateway device of claim 8, wherein the value of the listener reference count is maintained by an IGMP (Internet group management protocol) proxy at the gateway device.

10. The gateway device of claim 9, wherein the value of the listener reference count is maintained by increasing the value of the listener reference count by a value of one (1) each time a join request associated with the multicast group is received by the gateway device.

11. The gateway device of claim 10, wherein the value of the listener reference count is increased after determining that the client device is not already saved as a listener of the identified multicast group.

12. The gateway device of claim 8, wherein the value of the listener reference count is set before the leave request is received, based upon one or more responses to a general query output from the gateway device, the one or more responses being received by one or more of the client devices on the local network.

13. The gateway device of claim 8, wherein the gateway device removes the client device from a group of listeners of the identified multicast group.

14. One or more non-transitory computer readable media having instructions operable to cause one or more processors to perform the operations comprising:
establishing by an Internet group management protocol (IGMP) proxy at a gateway device a listener reference count using one or more responses to a general query sent by the IGMP proxy during a startup procedure from one or more client devices, wherein the listener reference count reflects a value of the one or more client devices that are currently joined to the multicast group;
receiving the one or more responses to the general query, wherein the one or more response identify the one or more client devices and one or more multicast groups to which the one or more client device are joined;
receiving a leave request from a client device of the one or more client devices, wherein the leave request is received at the gateway device;
identifying from the leave request, a multicast group of the one or more multicast groups associated with the leave request;
decreasing the value of the listener reference count that is associated with the identified multicast group;
determining whether the value of the listener reference count has reached zero;
if the value of the listener reference count has reached zero, reporting the leave request to a headend device without sending a specific query to the one or more client devices on a local network associated with the gateway device; and
if the value of the listener reference count has not reached zero, outputting one or more specific queries to the one or more client devices on the local network associated with the gateway device.

15. The one or more non-transitory computer-readable media of claim 14, wherein the value of the listener reference count is maintained by an IGMP (Internet group management protocol) proxy at the gateway device.

16. The one or more non-transitory computer-readable media of claim 15, wherein the value of the listener reference count is maintained by increasing the value of the listener reference count by a value of one (1) each time a join request associated with the multicast group is received by the gateway device.

17. The one or more non-transitory computer-readable media of claim 16, wherein the value of the listener reference count is increased after determining that the client device is not already saved as a listener of the identified multicast group.

18. The one or more non-transitory computer-readable media of claim 14, wherein the value of the listener reference count is set before the leave request is received, based upon one or more responses to a general query output from the gateway device, the one or more responses being received by one or more of the client devices on the local network.

19. The one or more non-transitory computer-readable media of claim 14, wherein the instructions are further operable to cause one or more processors to perform the operations comprising:
removing the client device from a group of listeners of the identified multicast group.

20. The one or more non-transitory computer-readable media of claim 14, wherein the value of the listener reference count is decreased after determining that the client device is saved as a listener of the identified multicast group.

* * * * *